Raymond & Miller,
Gate Spring.
N° 83,881. Patented Nov. 10, 1868.
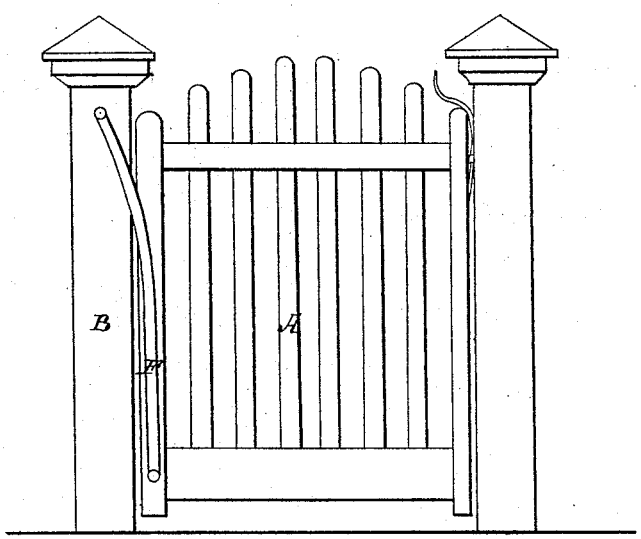
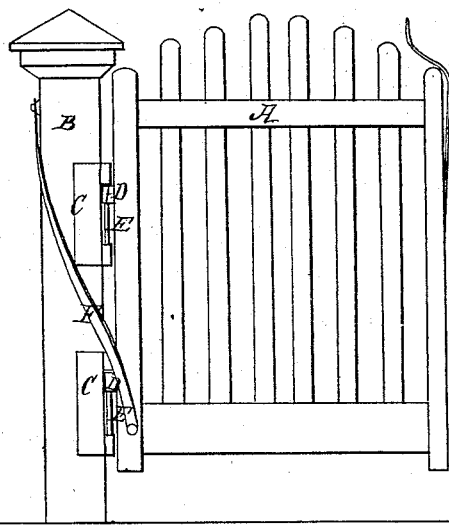
Witnesses:
J. H. Burridge
Frank S. Alden.
Inventor:
Fitch Raymond.
August Miller.

UNITED STATES PATENT OFFICE.

FITCH RAYMOND AND AUGUST MILLER, OF CLEVELAND, OHIO.

IMPROVEMENT IN GATES.

Specification forming part of Letters Patent No. 83,881, dated November 10, 1868.

*To all whom it may concern:*

Be it known that we, FITCH RAYMOND and AUGUST MILLER, of Cleveland, in the county of Cuyahoga and State of Ohio, have invented certain new and useful Improvements in Fence-Gates; and we do hereby declare that the following is a full and complete description of the same, reference being had to the accompanying drawings, making part of this specification, in which—

Figure 1 is a view of the gate when closed; Fig. 2, a view of the gate when open.

Like letters of reference refer to like parts in the different views.

This invention consists of the application of a spring to a gate in such way that, on opening said gate, it is continuously lifted from the ground, and when opened it is closed again by the reaction of the spring, all of which is constructed, arranged, and operated in the following manner:

In Fig. 1, A represents a gate hung to the post B by means of the hinges C. Said hinges are like the ordinary butt-hinges, with the exception of their being somewhat longer in proportion to their width; also, that the eye of the middle section, D, of the hinge does not fit closely in or between the eyes of the outside section, C; hence, as it will be observed, there is a considerable space or length of rod, E, between the eyes of the two sections, as seen in Fig. 2, the purpose of which will hereinafter be shown.

F is a spring, the lower end of which is fastened to the heel of the gate, whereas the upper end is fastened to the post. The shape, position, and the attachment of the spring to the gate and post are shown in Fig. 1.

The practical operation of this spring is as follows: Fig. 1 represents the gate as being shut. Now, on pushing open the gate, it will be obvious that the spring will take a partial turn around the post, more or less, as the gate is opened, the result of which will be to lengthen the distance from the end of the spring to the ground. This, as a consequence, will exert an upward draft of the gate, which, being unconfined by the hinges, will be lifted upward from the ground, as shown in Fig. 2, which represents the gate as being swung wide open. Now, on letting go of the gate, it will be swung back or closed by the reaction of the spring with sufficient force to cause it to latch without any personal aid.

By this arrangement of the spring and hinges the gate is self-closing, and, on being opened, will, in consequence of being lifted upward, pass over any obstruction that may be in the way.

The whole arrangement is neat in appearance, simple, and inexpensive.

What we claim as our improvement, and desire to secure by Letters Patent, is—

The spring F and hinges C, as constructed and arranged, in combination with the gate, for the purpose and in the manner specified.

FITCH RAYMOND.
AUGUST MILLER.

Witnesses:
W. H. BURRIDGE,
FRANK S. ALDEN.